United States Patent
Sundholm

(10) Patent No.: US 6,578,877 B1
(45) Date of Patent: Jun. 17, 2003

(54) METHOD OF FORMING A BRANCHING TO A PIPE, AND JUNCTION IN A PIPE

(76) Inventor: Göran Sundholm, Ilmari Kiannon kuja 3, FIN-04310 Tuusula (FI)

( * ) Notice: Subject to any disclaimer, the term of this patent is extended or adjusted under 35 U.S.C. 154(b) by 0 days.

(21) Appl. No.: 09/700,580

(22) PCT Filed: Jun. 10, 1999

(86) PCT No.: PCT/FI99/00508

§ 371 (c)(1),
(2), (4) Date: Jan. 5, 2001

(87) PCT Pub. No.: WO99/66251

PCT Pub. Date: Dec. 23, 1999

(30) Foreign Application Priority Data

Jun. 12, 1998 (FI) .................................................. 981373

(51) Int. Cl.⁷ ............................................... F16L 41/08
(52) U.S. Cl. .................. 285/197; 285/382; 285/133.11; 285/133.21
(58) Field of Search ....................... 285/133.11, 133.21, 285/197, 382; 137/317, 318

(56) References Cited

U.S. PATENT DOCUMENTS

| 264,936 A | * | 9/1882 | Doolittle .................... 285/199 |
| 1,336,423 A | | 4/1920 | Chadwick |
| 2,946,518 A | * | 7/1960 | Wahlin ....................... 285/266 |
| 3,762,743 A | * | 10/1973 | Hawle ........................ 285/197 |
| 3,844,590 A | * | 10/1974 | de la Fuente Burton .... 285/197 |
| 3,870,348 A | | 3/1975 | Hawkins |
| 4,078,833 A | * | 3/1978 | Carter .......................... 285/24 |
| 4,613,171 A | | 9/1986 | Corcoran |
| 4,655,035 A | * | 4/1987 | Sager, Jr. ..................... 60/307 |

FOREIGN PATENT DOCUMENTS

| GB | 2125920 | 3/1984 |
| GB | 2254119 | 9/1992 |
| NL | 7014127 | * 3/1972 | ................. 285/197 |

OTHER PUBLICATIONS

Automotive 101, Exhaust Emissions System Overview by Automotive Information Systerms, Inc., Jan. 6, 1996.*

* cited by examiner

Primary Examiner—Lynne H. Browne
Assistant Examiner—G M Collins
(74) Attorney, Agent, or Firm—Ladas & Parry

(57) ABSTRACT

The present invention relates to a junction in a pipe for connecting the pipe (1) into fluid communication with a fluid-carrying component (18), the junction comprising an opening (2) provided in the wall of the pipe and a connecting part (3) comprising a tube-clamp-like joint (3) comprising a first part (4) and a second part, which can be tightened against the first part by means of tightening means (6) and which comprises a narower first portion (10) and a broader second portion (11), whereby the narrower portion is positioned in the opening (2) and the broader portion outside the pipe (1). The invention also relates to a method of forming to the wall of a pipe a branching for receiving a fluid-carrying component.

14 Claims, 6 Drawing Sheets

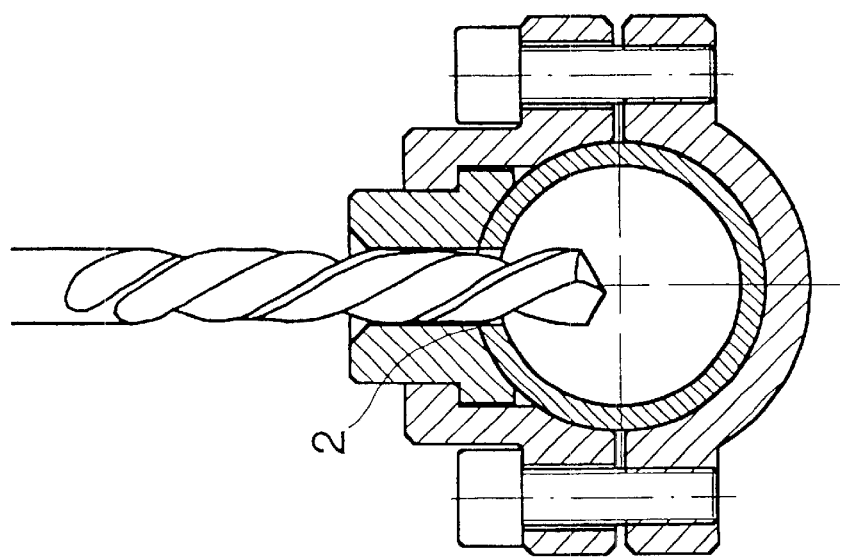
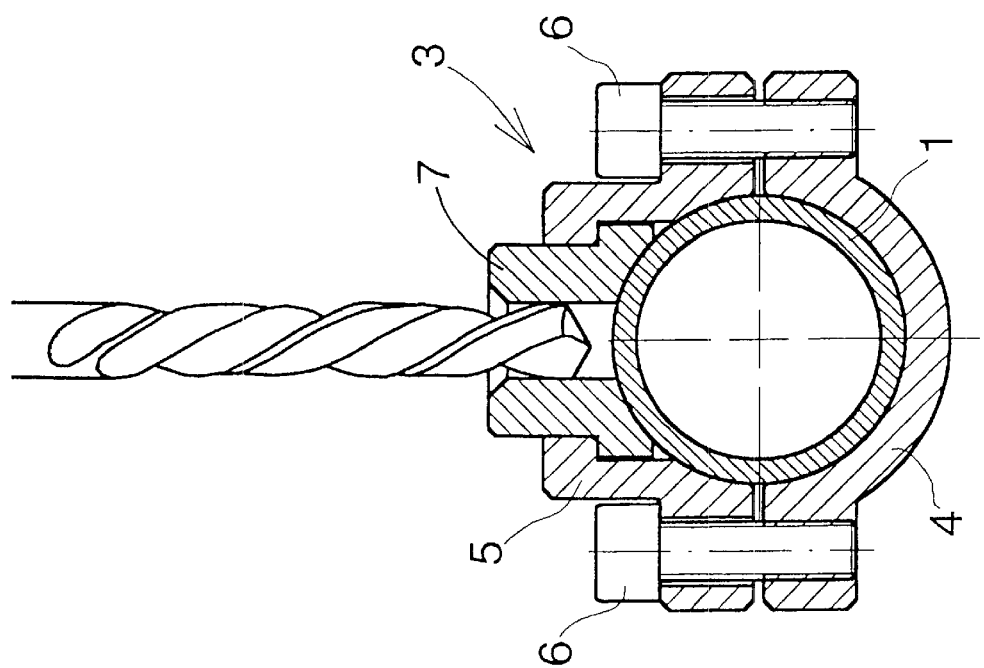

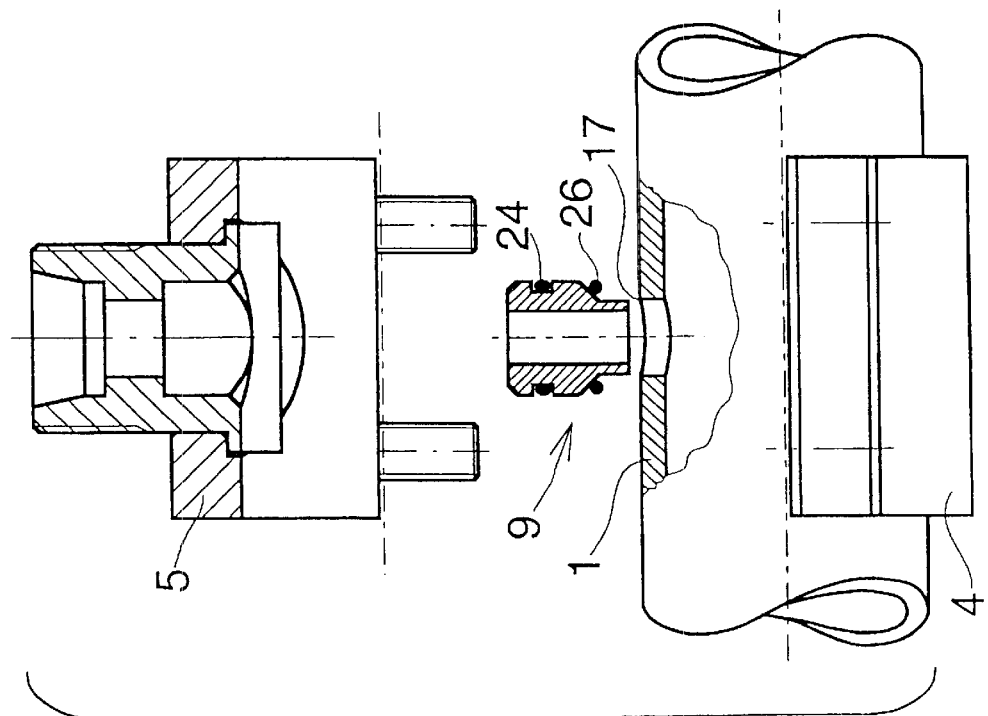
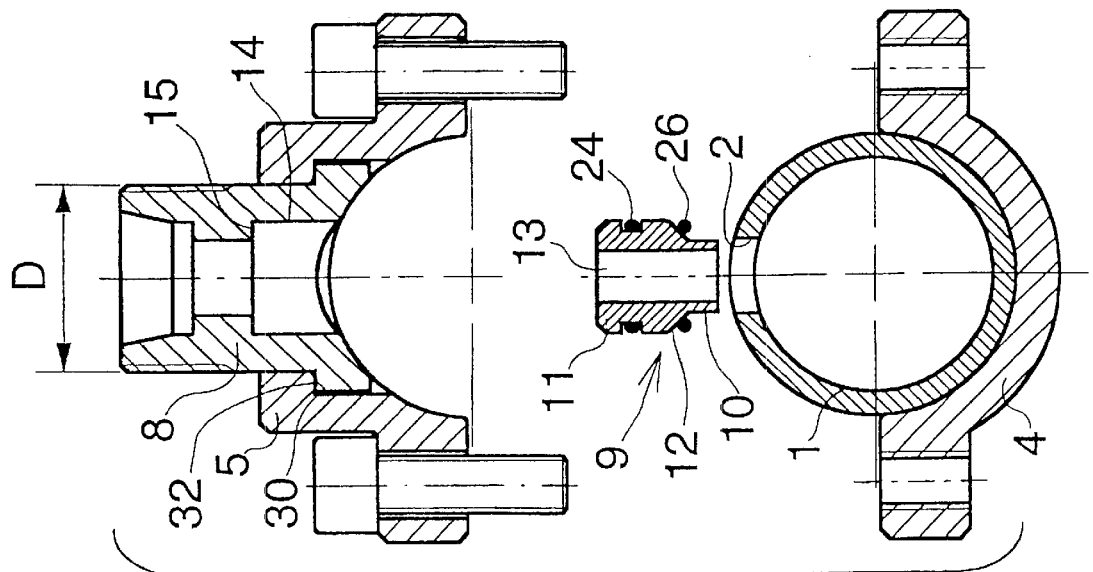

METHOD OF FORMING A BRANCHING TO A PIPE, AND JUNCTION IN A PIPE

BACKGROUND OF THE INVENTION

The invention relates to a method of forming to the wall of a pipe a branching for receiving a fluid-carrying component, the method comprising processing into the pipe wall a cylindrical opening having a smaller diameter than the pipe, thereafter fastening the component to the pipe at the opening such that the pipe and the component are in fluid communication, the method comprising arranging around the pipe a tube-clamp-like joint comprising a first part and a second part, which can be tightened against the first part by means of tightening means and which comprises a conduit and a bushing part and a narrower first portion and a broader second portion, and the narrower portion is inserted in the hole, and the second part it tightened against the pipe wall and the component can be fastened in the conduit.

The invention also relates to a junction in a pipe for connecting the pipe into fluid communication with a fluid-carrying component, the junction comprising an opening provided in the wall of the pipe and a connecting part between the pipe and the component, the connecting part comprising a tube-clamp-like joint comprising a first part and a second part, which can be tightened against the first part by means of tightening means and which comprises a bushing part and a narrower first portion and a broader second portion, whereby the narrower portion is positioned in the opening and is surrounded by the walls of the hole and the broader portion is positioned outside the pipe, the narrower portion comprises a first projected surface which is smaller than a second projected surface in the broader portion of the second part, the projected surfaces being directed away from one another, the first projected surface being arranged to exert a first force directed at the narrower portion during fluid pressure in the pipe the first force tending to push away the narrower portion from the hole and the second projected surface being arranged to exert a force directed at the broader portion during the same fluid pressure, this force tending to push the narrower portion towards the pipe in such a manner that a force acts so as to wedge the narrower portion into the hole.

Fluid communication refers herein to the ability of fluid to stream in the junction.

The invention is particularly well applicable to metal pipes, although other pipe materials are also feasible.

There are many ways of connecting a fluid-carrying component, e.g. a pipe or a pipe part, to the wall of another pipe. A common way is to use in the junction a T coupling implemented by a tee. However, a T coupling suffers from drawbacks. One drawback is that the junction is time-consuming, because the pipe has to be cut off to the right length to allow room for the tee, and the tee then has to be connected in a fluid-tight manner at the three free ends thereof. If the junction is implemented by welding, which is often the case in high pressure pipes, the junction requires extensive welding, which may impair the characteristics of the pipe material, even though heat treatment optionally follows the welding. Another drawback in the use of a T coupling is that the tee may be, in spite of a relatively small pipe dimension of 38 mm, for example, extremely costly, particularly in high pressure applications.

When a spray head or a sprinkler operated by a pressure exceeding 16 bar, e.g. 25 to 300 bar, is to be connected to a pipe, the junction is costly to implement by known methods and known components, because especially high safety and tightness requirements are made on a highly loaded junction.

It is known through GB 2 254 119 and GB 2 125 920, for example, to connect components to a pipe by processing an opening into the wall of the pipe. Junctions implemented in this way are tightened by means of elastic seals. Elastic seals are always complicated in high pressure applications, because they easily yield to pressure, easily causing leakage. In the known construction according to GB 2 125 920, a tongue 18 remains in a certain portion and prevents fluid from flowing freely to and from the pipe. The higher the pressure of the fluid in the pipe, the stronger is the resistance provided by the tongue.

BRIEF DESCRIPTION OF THE INVENTION

For the purpose of eliminating the above drawbacks, the method of the invention is characterized by processing a cylindrical hole having a diameter smaller than the diameter of the pipe, the hole forming said opening, thereupon tightening the second part, so that its narrower portion plastically deforms the walls of the hole so that these walls encircle the narrower portion fluid tight.

According to a preferred embodiment, which is especially suitable for high pressure connections, fluid is introduced into the pipe under high pressure which acts on a first projected surface and a second projected surface that is larger than the first projected surface, the pressure on the first surface producing a first force that tends to push away the narrower portion from the hole and the pressure on the second surface producing another force whose direction is opposite to the first force and which is stronger than the first force and which pushes the narrower portion into the hole for deformation of the walls of the hole. The use of a high pressure, e.g. 100 to 300 bar, results in a very firm connection. A lower pressure in excess of 16 bar, which is typically acting when the pipe is in use, keeps the junction tight. Thus a pressure in the pipe tends to close or seal, not open, the junction.

The preferred embodiments of the method of the invention are disclosed in the attached claims 2 to 5.

The junction of the invention is characterized in that the walls of the hole are plastically deformed, and encircle the narrower portion fluid tight. The construction is particularly suitable for high pressure applications. The use of an insert which is small in relation to the tube clamp and provided with a conical surface for resting against the edge of the hole results in an economic solution allowing the connection of different components to the pipe. Such an insert is easy to make in comparison to a solution in which the whole of the second part of the joint would be produced as an uniform, integrated part. An integrated part would be very difficult, if not impossible to make by machining, and would consequently have to be cast.

The major advantages of the method of the invention are that the branching can be produced simply, rapidly and economically without elastic seals and that the result is a branching which tightly and reliably connects the fluid-carrying component in spite of application of high pressure.

The major advantages of the junction are that it is tight even when high pressure is applied, that it is reliable and can be produced economically.

BRIEF DESCRIPTION OF THE FIGURES

In the following the invention will be described by means of two embodiments with reference to the attached drawing, in which FIGS. 1 to 6 illustrate a first embodiment of the method of making a branching according to the invention.

DETAILED DESCRIPTION OF THE INVENTION

Figure 6:
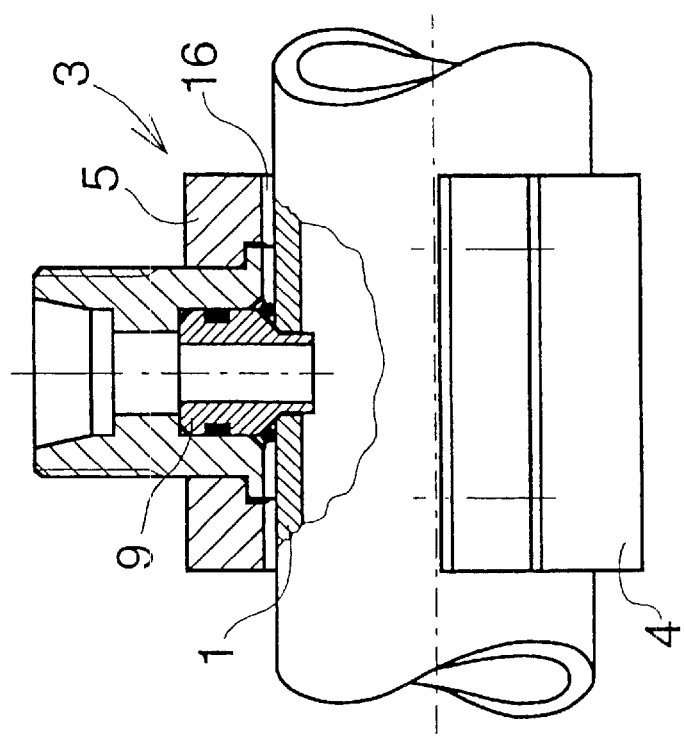

Upon making a branching according to the invention, a hole is first made in a pipe 1 which is to be provided with the branching, see FIGS. 1 and 2 which illustrate a manner of processing a hole 2 in the pipe. The pipe is a metal pipe 1 and the hole 2 is made with an ordinary drill bit, which upon drilling is supported by a tube-clamp-like joint 3 which encircles the pipe 1. The joint 3 comprises a lower part 4 and an upper part 5 which are tightened against one another by screws 6 or bolts. The upper part 5 is provided with a bushing part 7 which guides the drill bit during drilling. Alternatively, the hole 2 can be drilled freehand, i.e. without a tube clamp 3, but the joint is preferable as it significantly facilitates the drilling and ensures that the hole 2 is located exactly at the desired point. Instead of drilling, it is feasible that the hole is made by another manner.

After the hole 2 has been drilled, the joint 3 is opened and the bushing part 7 is replaced by another bushing part 8, see FIGS. 3 and 4. FIG. 4 shows an explosion view of FIG. 3 seen from the side. In FIG. 4, reference 1 denotes a long pipe, which is usually employed in utilizing the invention. An insert 9 is placed between the upper and lower parts of the tube clamp. The insert 9 is provided with an at least mainly cylindrical narrower portion 10 and a cylindrical broader portion 11, a conical surface 12 forming between said portions. The diameter of the narrower portion 10 corresponds mainly to the diameter of the hole 2. A conduit 13 extends through the insert 9.

Figure 5:
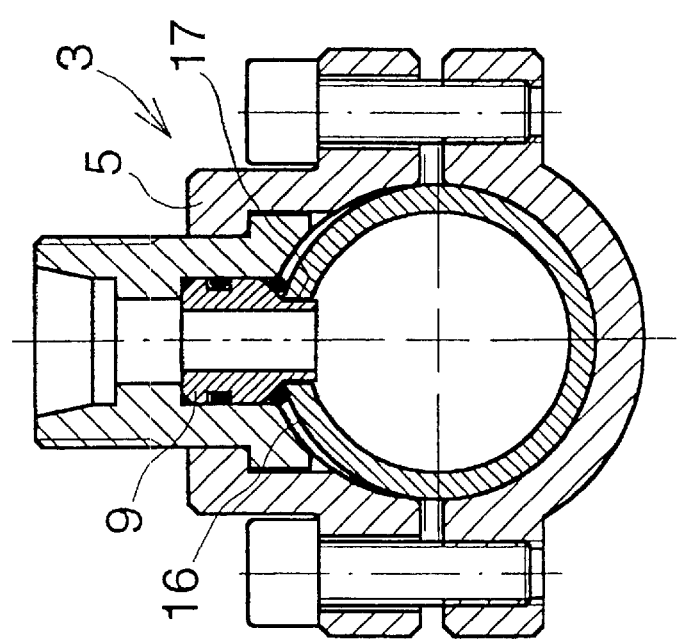

The bushing part 8 comprises a recess 14 for receiving the broader part 11 of the insert (cf. FIG. 5). The recess 14 comprises an abut surface 15 against which the upper portion 11 of the insert 9 is arranged to rest. Thus the bushing part 8 comprises a conduit 25 whose diameter is smaller than that of the recess 14.

The lower end of the bushing part 8 is provided with a flange-like portion 30 which is arranged under a flange-like clamp frame 31 in the upper part 5 of the joint such that a tightening surface 32 is provided between the flange-like portion 30 and the flange-like clamp frame 31.

The upper part 5 of the joint is tightened against the lower part 4 of the joint by means of the screws 6, see FIGS. 5 and 6. FIG. 6 is a side view of FIG. 5. As the screws 6 are tightened, the bushing part 8 and the insert 9 bear down on the pipe 1. First, a gap 16 is formed between the pipe 1 and the upper part 5 of the joint 3 as a result of the conical part 12 of the insert resting against the upper edge 17 of the hole. By further tightening of the screws 6 of the joint, the conical part of the insert penetrates to some degree into the hole 2 and deforms the area closest to the hole, the upper edge 17 of the hole in particular.

Figure 7:
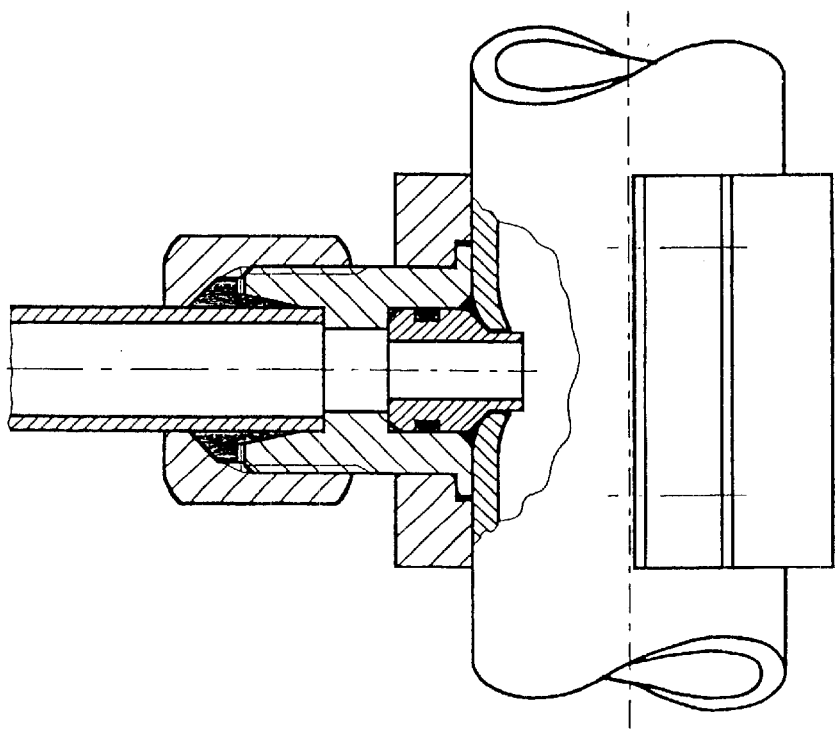
FIGS. 7 and 8 show the results of FIGS. 1 to 6, FIGS. 9 and 10 illustrate a second embodiment of the method of making a branching according to the invention.
Figure 8:
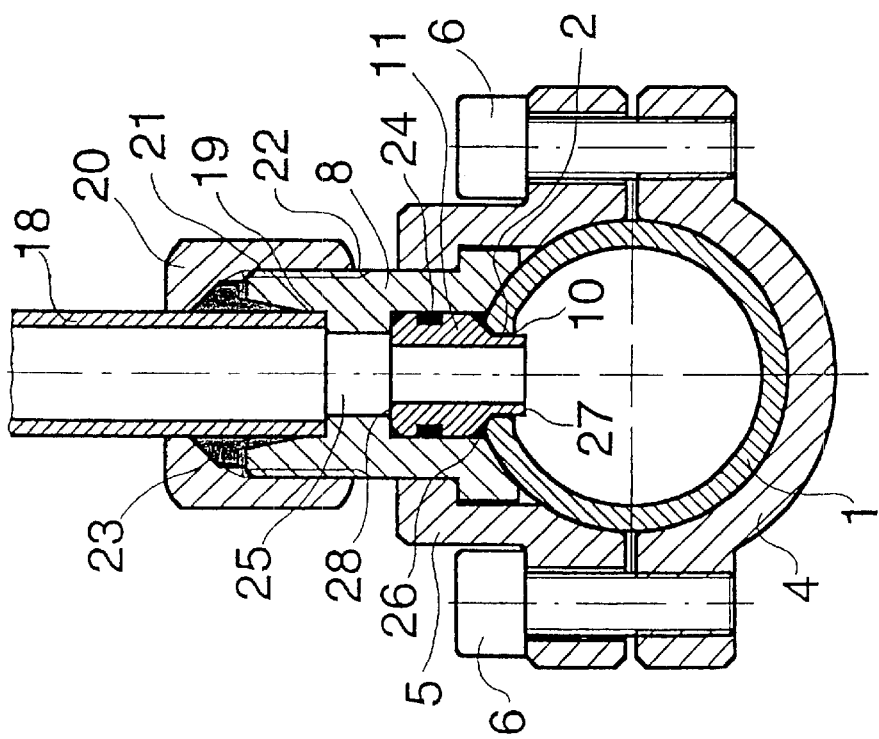

FIGS. 7 and 8 show a completed junction in the form of a T coupling with the edge 17 of the hole deformed. The figures show how a pipe 18 having a smaller diameter than the pipe 1 is connected to the latter pipe. Instead of a straight pipe, a pipe bow or another pipe component can naturally be used. The pipe 18 is located in a recess 19 in the bushing part 8 and is fastened to the bushing part by a cap 20 having a hole for the pipe and threads 21 that operate together with threads 22 in the bushing part. The space under the cap 20 and the recess 19 contain material 23 that cuts into the pipe 18 and provides a tight joint between the pipe 18 and the bushing part 8 and prevents the pipe 18 from being axially drawn away from the recess 14. In stead of such a cutting coupling, it is feasible, mainly in exceptional cases, that the pipe 18 is fastened to the bushing part 8 by welding. The insert 9 comprises in its broader portion an O seal 24 which prevents fluid from passing between the insert and the wall of the recess 14. A second seal 26 is arranged in the area of the conical surface of the insert. This seal is not necessary, but serves as extra security to prevent fluid in the pipe 1 from passing outside the bushing part 8 in an area between the bushing part and the upper part 5 of the tube clamp.

The junction in FIG. 7 is particularly advantageous because the narrower portion 10 of the insert 9 comprises a surface 27 which is under fluid pressure and smaller than a surface 28 in its upper portion 11 under fluid pressure. The surface 28 is under fluid pressure because the conduit 13 of the insert has a smaller diameter than the conduit 25 of the bushing part 8. Because the surface 28 is larger than the surface 27, a pressure in the pipes 1, 18 produces a force which tends to push the insert 9 towards the pipe 1. When a pressure exceeding 25 bar, e.g. 100 to 300 bar, is used, the insert 9 is pushed forcefully against the pipe 1 such that the pipe material is deformed plastically in the area of the hole 2. The insert 9 can be heavily wedged into the pipe 1 by application of such a pressure. A pressure range between 25 and 100 bar is also feasible, but in that case the force wedging the insert is naturally not that effective. To guarantee the rigidity of the pipe joint under all circumstances, the screws 6 are tightened after the pressure load. The surfaces 27 and 28 are parallel, but this is not necessary because to achieve a force wedging the insert 9 into the pipe, it is vital that the insert comprises a first projected surface which is larger than a second projected surface, the projected surface being opposite in direction and the first projected surface being arranged under fluid pressure in the pipe 1 to push in the insert 9 against the pipe 1. In principle, the projected surfaces can be of any shape.

Figure 10:
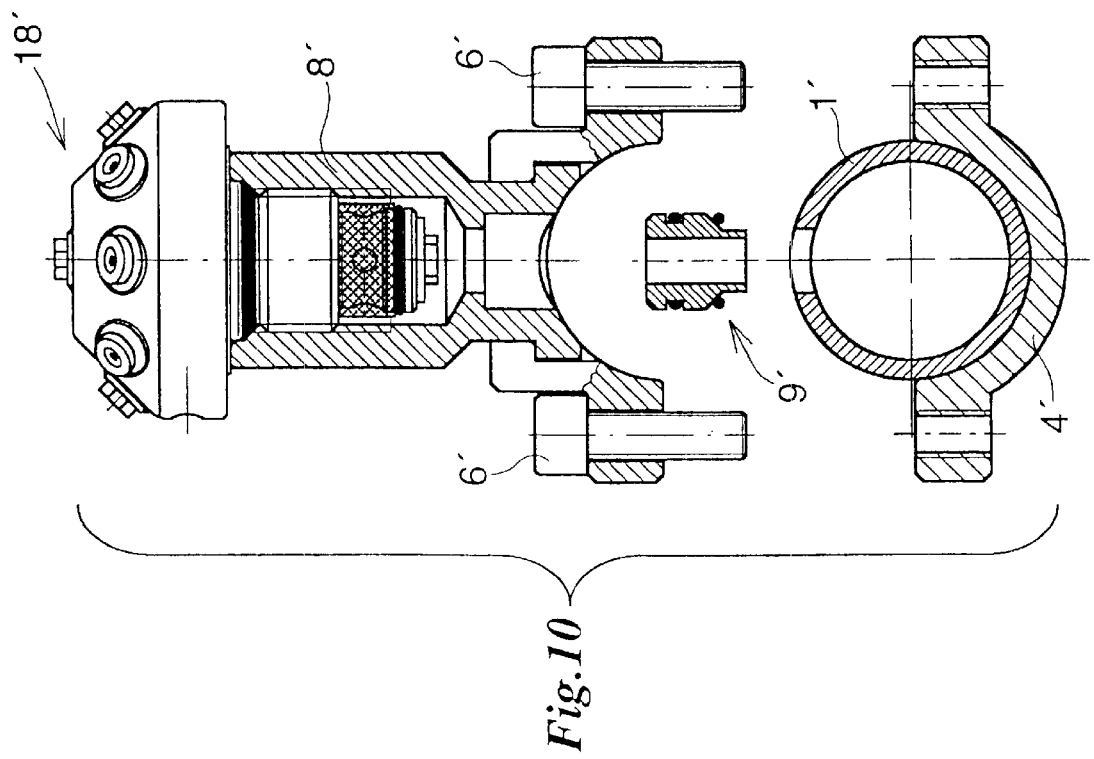
Figure 9:
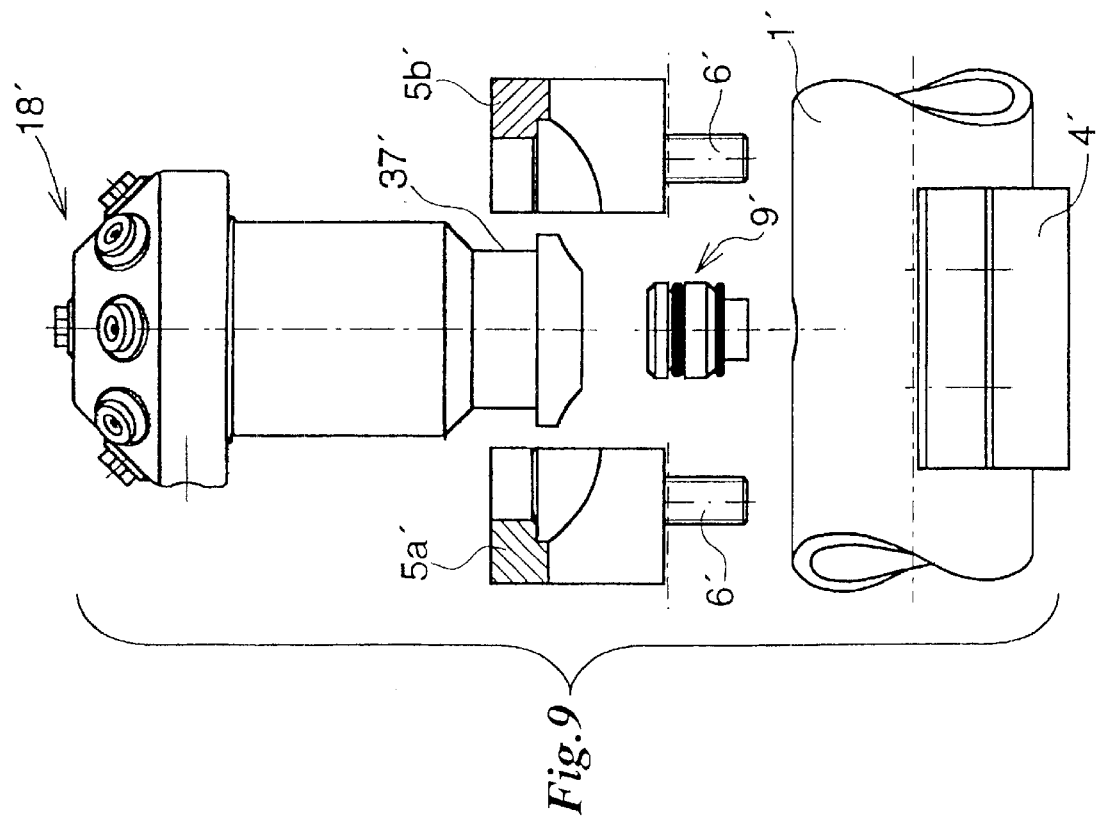
Figure 12:
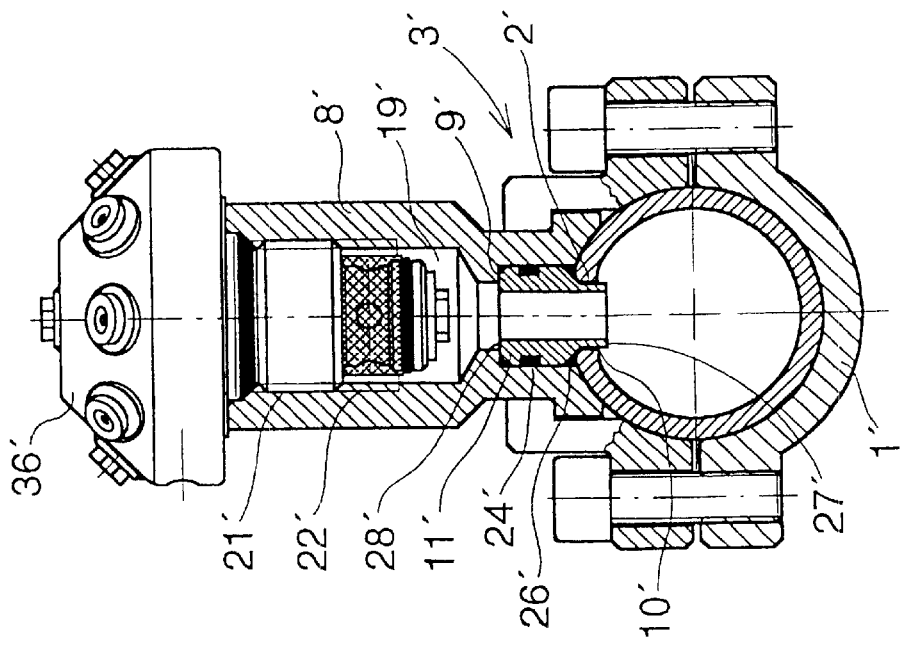
FIGS. 11 and 12 show the results of FIGS. 9 and 10.
Figure 11:
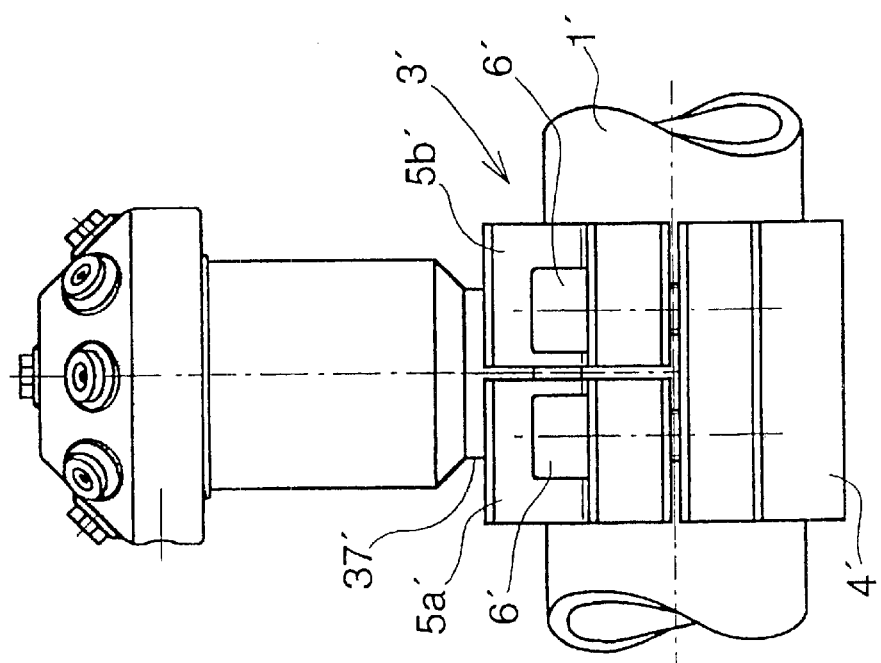

FIGS. 9 to 12 show another embodiment and another application of the junction. In stead of a pipe, a spray head 18' or a sprinkler is connected to the pipe 1' in the figures. FIGS. 9 and 10 show an explosion view of FIGS. 3 and 4; FIGS. 11 and 12 show the completed junction. Even this embodiment employs a tube-clamp-like joint 3' and an insert 9' like the one in FIGS. 3 to 8. The joint 3' differs from the joint 3 in FIGS. 3 to 8 in that the upper part of the joint is composed of two parts 5a', 5b'. The reason for the use of two parts 5a', 5b' is that the bushing part 8' for receiving the spray head has such a large outer diameter that it cannot pass through the flange-like periphery of the inner diameter D of the part 5 shown in FIG. 3. In other words, the installation of a projection 37' in the bushing part 8' against the inner diameter of the flange-like periphery from the lower side would become impossible. The bushing part 8' cannot be installed from the upper side either because the flange-like portion 30' has a larger diameter than the inner diameter of the flange-like periphery, which is also true of FIGS. 3 to 8. However, the parts 5a' and 5b' enable simple mounting.

The bushing part 9' comprises a recess 19' for receiving the spray head 18'. The recess 19' is provided with threads 22' for co-operation with corresponding threads 21' in the body 36' of the spray head.

The parts 5a' and 5b' are tightened against the pipe 1' with screws, as in FIGS. 5 and 6.

FIGS. 11 and 12 show the completed junction, in which the insert 9' has plastically deformed the material around the hole 2'.

The insert 9, 9' is of a corrosion resistant metal, while the rest of the tube-clamp-like joint 3, 3' is of a metal having lower corrosion resistance. This provides an economical junction.

In the above the invention has been described with reference to only two embodiments and it should therefore be pointed out that the details of the invention may vary in a variety of ways within the scope of the attached claims. Accordingly, instead of a pipe or a spray head, any fluid-carrying component may be employed. A separate insert 9, 9' is not necessary in all applications, but it is to be preferred. The formation of the bushing 8, 8' may vary.

What is claimed is:

1. In a method of forming to the wall of a pipe (1, 1') a branching for receiving a fluid-carrying component (18, 18'), the method comprising processing into the pipe wall a cylindrical hole (2, 2') having at least one wall defining a smaller diameter than a diameter of the pipe, arranging around the pipe (1, 1') a tube-clamp-like joint (3, 3') comprising a first part (4, 4') and a second part (5, 5a' 5b') for tightening against the pipe wall and first part by, tightening means (6, 6'), the second part comprising a conduit (25) with a bushing (8, 9, 8',9'), the bushing having a narrower first portion (10, 10') for insertion into the hole (2, 2') and a broader second portion (11, 11'), inserting the narrower portion (10, 10') into the hole (2, 2'), and tightening the second part (5, 5a', 5b') is tightened against the pipe wall and the component (18, 18') fastened in fluid communication with the conduit (25), the improvement wherein the second part (5, 5a', 5b') is tightened so that the narrower portion of the bushing (10, 10') plastically deforms the wall of the hole (2, 2') and the wall of the hole encircles the narrower portion fluid tight.

2. A method as claimed in claim 1, characterized by introducing into the pipe (1, 1') a fluid under high pressure, the pressure acting on a first projected surface (27, 27') and a second projected surface (28, 28') which is larger than the first projected surface, the pressure on the first surface producing a first force which tends to push away the narrower portion (10, 10') from the hole (2, 2') and the pressure on the second surface producing a second force, which is opposite to the first force and stronger than the first force and which pushes the narrower portion into the hole and deforms the wall of the hole.

3. A method as claimed in claim 1, characterized by introducing the fluid into the pipe (1, 1') by a pressure of 25 to 300 bar.

4. A method as claimed in claim 1 for providing a branching in the form of a branch in the form of a T coupling in the pipe, characterized by using another pipe (18) as the component.

5. A method as claimed in claim 1, characterized by using a pray head (18') as the component.

6. A junction in a pipe for connecting the pipe (1, 1') into fluid communication with a fluid-carrying component (18, 18'), the junction comprising a hole (2, 2') provided in the wall of the pipe and a connecting part (3, 3') between the pipe and the component, the connecting part comprising a tube-clamp-like joint (3, 3') having a first part (4, 4') and a second part (5a', 5b'), which can be tightened against the first part by means of tightening means (6, 6') and which comprises a bushing part (8, 9, 8', 9') and a narrower first portion (10, 10') and a broader second portion (11, 11'), whereby the narrower portion is positioned in the opening (2, 2') and is surrounded by the walls of the hole and the broader portion is positioned outside the pipe (1, 1'), the narrower portion (10, 10') comprises a first projected surface (27, 27') which is smaller than a second projected surface (28, 28') in the broader portion (11, 11') of the second part, the projected surfaces being directed away from one another, the first projected surface being arranged to exert a first force directed at the narrower portion during fluid pressure in the pipe (1, 1'), the first force tending to push away the narrower portion from the hole (2, 2') and the second projected surface being arranged to exert a force directed at the broader portion during the same fluid pressure, this force tending to push the narrower portion towards the pipe in such a manner that a force acts so as to wedge the narrower portion into the hole, characterized in that the walls of the hole (2, 2') are plastically deformed, and encircle the narrower portion (10, 10') fluidum-tight.

7. A junction as claimed in claim 6, characterized by the second part comprising an insert (9, 9') having a conical surface for resting against the edge of the hole (2, 2').

8. A junction as claimed in claim 7, characterized by the insert (9, 9') being of a corrosion resistant metal, while the rest of the tube-clamp-like joint (3, 3') is of a metal having lower corrosion resistance.

9. A junction as claimed in claim 7, characterized by the insert comprising said narrow portion (10, 10') which is insertable into the hole (2, 2').

10. A junction as claimed in claim 9, characterized by the insert (9, 9') comprising said broader portion (11, 11') provided in the bushing part (8, 8') in the second part (5, 5a', 5b').

11. A junction as claimed in claim 10, characterized by a seal (24, 24') being arranged around the broader portion (11, 11') for sealing the insert (9, 9') against the bushing part (8, 8').

12. A junction as claimed in claim 10, characterized by the component being a second pipe (18) and the junction being a T coupling, whereby the bushing part (8) comprises a recess (19) for receiving the second pipe, and threads (22) for receiving a cap (20) which is provided with holes for the second pipe and threads (21) corresponding to the threads of the bushing part, by means of which threads (21, 22) the second pipe is fastened to the bushing part as a cutting coupling.

13. A junction as claimed in claim 10, characterized by the component being a spray head (18'), the bushing part (8') comprising a recess (19) for receiving the body of the spray head, and threads (22') for receiving threads (21') in the body (36') of the spray head, by means of which threads in the body the spray head is fastened to the bushing part (8').

14. A junction as claimed in claim 13, characterized by the second part of the joint comprising two parts (5a' and 5b') which comprise a flange-like clamp frame arranged to be inserted into a projection (37') in the bushing part (8') whose outer diameter in the area of the recess (19') is larger than the inner diameter of the flange-like clamp periphery.

* * * * *